United States Patent [19]

Hatanaka et al.

[11] 4,329,275

[45] May 11, 1982

[54] HEAT-CURABLE POLYSILOXANE COMPOSITION

[75] Inventors: Masayuki Hatanaka, Ouramachi; Atsushi Kurita, Ohta, both of Japan

[73] Assignee: Toshiba Silicone Co., Ltd., Tokyo, Japan

[21] Appl. No.: 171,526

[22] Filed: Jul. 23, 1980

[30] Foreign Application Priority Data

Jul. 27, 1979 [JP] Japan .................................. 54-95848
Jul. 27, 1979 [JP] Japan .................................. 54-95849

[51] Int. Cl.³ ....................... C08L 83/06; C08G 77/08
[52] U.S. Cl. .................................... 524/862; 525/478; 528/15; 528/23; 528/24; 528/31
[58] Field of Search ..................... 525/478; 260/37 SB; 528/15

[56] References Cited

U.S. PATENT DOCUMENTS 3,188,300  6/1965  Chalk .................................. 525/478
3,992,355  11/1976  Itoh et al. ........................... 525/478
4,020,014  4/1977  Service et al. ...................... 525/478

FOREIGN PATENT DOCUMENTS 52-77164  6/1977  Japan ................................. 525/478

Primary Examiner—Wilbert J. Briggs, Sr.
Attorney, Agent, or Firm—Blanchard, Flynn, Thiel, Boutell & Tanis

[57] ABSTRACT

A heat-curable polysiloxane composition comprised of polydiorganosiloxane having at least 2 vinyl groups and polyorganohydrogensiloxane having at least 2 hydrogen atoms, and containing, as a catalyst, a platinum compound and a phosphorus compound or complex thereof, together with an organic peroxide compound which has no hydroperoxy group in the molecule.

28 Claims, No Drawings

HEAT-CURABLE POLYSILOXANE COMPOSITION

The present invention relates to a heat-curable polysiloxane composition. More particularly, the present invention relates to a polyorganosiloxane composition which is very stable at room temperature and is rapidly curable at an optional elevated temperature. According to the invention, the hydrosilylation reaction takes place between a vinyl group bonded to a silicon atom and a silicon-hydrogen bond, in the presence of a minute amount of a catalyst system such as: a platinum compound, a phosphorus compound and an organic peroxide; a platinum-phosphorus complex and an organic peroxide; or a reaction product of a platinum-phosphorus complex and an organic peroxide, in which in all cases the organic peroxide has no hydroperoxy group in the molecule. The aforementioned curing can be effected in such a manner.

In the system of curing by reaction between a vinyl group bonded to a silicon atom and a silicon-hydrogen bond, if a platinum compound, such as chloroplatinic acid, is used as a catalyst, the reaction progresses at temperatures approximating room temperature, with the result being that the molecular weight of the polyorganosiloxane organosiloxane is increased and undesirable phenomena, such as an increase of the viscosity and gelation, are caused. Especially when the molecular weight of a polyorganosiloxane used as a base polymer is high, as in the case of a heat-curable silicone rubber, with a slight advance of the hydrosilylation reaction, crosslinking is caused whereby to effect curing and to form an elastomer. Accordingly, during the processing operation after incorporation of the catalyst, the composition becomes rubbery and further processing becomes impossible. Even if a polyorganosiloxane having a relatively low molecular weight is used as a base polymer, it is impossible to store a composition containing the catalyst incorporated therein for a long time and, therefore, a disadvantageous operation of metering and adding a minute amount of the catalyst just before use is required.

As means for eliminating these defects, there have been proposed various methods in which the reaction rate at temperatures approximating room temperature is controlled. For example, Japanese Pat. Publication No. 19193/67 discloses a method using a divalent platinum-phosphorus complex. However, no satisfactory controlling effect can be obtained. Furthermore, Japanese Pat. Publication No. 31476/69 purposes a method in which an organic compound having no nitrogen, phosphorus or sulfur atoms at the α-position and which includes an acetylene bond is used as a reaction inhibitor. However, this method is still defective in that if the amount of the reaction inhibitor is too small, no substantial effect can be obtained and if the amount of the reaction inhibitor is too large, insufficient curing is caused or wrinkles are formed on the surface of the cured product. The use of acrylonitrile or the like as a reaction inhibitor has been proposed, but also this proposal has similar defects. Japanese Patent Publication No. 50854/77 discloses a method in which the abovementioned defects are overcome by using a zero-valent platinum-phosphorus complex as a catalyst. However, this method is still defective in that the catalyst is deteriorated by air oxidation and it becomes impossible to attain the intended reaction-inhibiting effect at room temperature. Japanese Pat. Application Laid-Open No. 146755/78 proposes a method in which a tin salt is added as a stabilizer, and a considerable stabilizing effect can be attained by this proposal. However, even if this stabilizer is used, when heat is generated during milling or extrusion of a heat-curable silicone rubber, a curing phenomenon occurs, and so, obstruction of the processing is often caused. Therefore, the processing temperature should be controlled by cooling the composition. Furthermore, U.S. Pat. No. 4,061,609 proposes a method in which a hydroperoxide is used as a reaction inhibitor. However, if such a reaction inhibitor is used, a defect of foaming is caused when hot air vulcanization is carried out.

The present invention provides a heat-curable polyorganosiloxane composition in which all of the foregoing defects are eliminated. The present invention can be applied to silicone rubbers, liquid silicone rubbers and silicone resins.

More specifically, in accordance with a fundamental aspect of the present invention, there is provided a curable polyorganosiloxane composition comprising (A) 100 parts by weight of a polyorganosiloxane having at least 2 vinyl groups bonded to silicon atom(s), on the average, in the molecule, (B) 0.1 to 30 parts by weight of a polyorganohydrogensiloxane having at least 2 hydrogen atoms bonded to silicon atom(s), on the average, in the molecule, with the proviso that if the polyorganosiloxane (A) has 2 vinyl groups bonded to silicon atom(s), on the average, in the molecule, more than 2 hydrogen atoms bonded to silicon atom(s) are present, on the average, in the molecule of (B), (C) 0.000001 to 0.1 part by weight of a platinum compound, (D) a phosphorus compound represented by the general formula:

$$PR_3$$

in which the R groups, which can be the same or different, stand for a monovalent group selected from a monovalent, substituted or unsubstituted, hydrocarbon group, an alkoxy group, an aryloxy group and a hydroxyl group, in an amount corresponding to at least one equivalent to the platinum atom in the platinum compound (C), and (E) an organic peroxide having no hydroperoxy group in the molecule in an amount corresponding to at least one equivalent to the phosphorus compound (D).

In accordance with the second aspect of the present invention, there is provided a polyorganosiloxane composition which comprises the above-mentioned components (A) and (B), and (F) a catalyst system selected from (1) a mixture comprising (a) 0.000001 to 0.1 part by weight of a platinum-phosphorus complex and (b) 0.00001 to less than 0.1 part by weight of an organic peroxide having no hydroperoxy group in the molecule, (2) a reaction product of the components (a) and (b) and (3) a mixture of the mixture (1) and the reaction product (2).

The polyorganosiloxane (A) that is used in the present invention is comprised of organosiloxane units having a monovalent substituted or unsubstituted hydrocarbon group bonded to the silicon atom, and the remaining valences of the silicon atom are saturated with the siloxane bond and, in some cases, partially with silicon-containing functional groups. From the viewpoint of easiness in the synthesis, alkyl, vinyl and phenyl groups are ordinarily used as the substituted or unsubstituted hydrocarbon groups. If oil resistance is required for the cured composition, a 3,3,3-trifluoropropyl group can be used. In any event, in order to obtain a cured product, at least 2 vinyl groups must be present, on the average, in the polyorganosiloxane molecule. The said vinyl groups can be bonded to the same silicon atom or to different silicon atoms in the molecule.

If the composition of the present invention is to form a silicone rubber, that is, if the composition is of the type generally known as a heat-curable silicone rubber, a polyorganosiloxane represented by the following general formula is preferred as the component (A):

$$R^2[R_2^1SiO]_nSiR_2^1R^2$$

in which $R^1$ is a monovalent substituted or unsubstituted hydrocarbon group, at least 85 mole % of which are methyl groups and 0.01 to 2 mole % of which are vinyl groups, $R^2$ is a monovalent group selected from the group consisting of methyl, vinyl and hydroxyl groups, n is a value of 1,000 to 10,000, and at least two of $R^1$ and $R^2$ are vinyl groups, on the average, in the molecule.

A preferred range of the value n is from 5,000 to 10,000 except when the product is applied for a special purpose. As the group $R^1$, there can be mentioned, for example, alkyl groups such as methyl, ethyl, propyl, butyl, hexyl, octyl, decyl and dodecyl groups, alkenyl groups such as vinyl and allyl groups, a phenyl group, a β-phenylethyl group and a 3,3,3-trifluoropropyl group. In order to obtain a cured product having a good heat resistance and an excellent rubbery elasticity, it is preferred that at least 85 mole % of $R^1$ are methyl groups. If the proportion of the vinyl groups is smaller than 0.01 mole %, on the average, curing cannot be sufficiently performed, and if the proportion of the vinyl groups is larger than 2 mole %, on the average, the heat resistance is reduced. A mixture which is formed by blending two or more components (A) having a vinyl group content of 0 to 5 mole % in $R^1$ so that the average vinyl group content is 0.01 to 2 mole % can be used. If the value of n is smaller than 1,000, a cured product having sufficient mechanical properties cannot be obtained, and if the value of n exceeds 10,000, the processability is lowered.

When the composition of the present invention is a liquid silicone rubber, commonly known as an RTV (room temperature vulcanization) silicone rubber (the composition of the present invention is cured under heating, despite of the common (RTV) name), a polyorganopolysiloxane represented by the following general formula is preferred as the component (A):

$$R^4[R_2^3SiO]_mSiR_2^3R^4$$

wherein $R^3$ stands for a monovalent substituted or unsubstituted hydrocarbon group, at least 65 mole % of which are methyl groups, $R^4$ is a monovalent group selected from the group consisting of methyl and vinyl groups, the value of m is from 50 to 1,000, and at least two of $R^3$ and $R^4$ are vinyl groups, on the average, in the molecule.

The same groups as mentioned above with respect to $R^1$ can be exemplified for $R^3$. In order to obtain a cured product having a good heat resistance and an excellent rubber elasticity, it is preferred that at least 65 mole % of $R^3$ are methyl groups. Vinyl groups can be present as either $R^3$ or $R^4$. However, from the viewpoint of easiness in the synthesis and in order to perform the crosslinking reaction effectively and promptly, a polyorganosiloxane in which $R^3$ are methyl groups and $R^4$ are vinyl groups is ordinarily preferred. If the value of m is smaller than 50, the cured product is brittle and no satisfactory rubbery elasticity is obtained. If the value of m exceeds 1,000, the flowability of the composition before curing is degraded.

When the composition of the present invention is to be a silicone resin, a polyorganosiloxane having recurring units represented by the following average unit formula is preferred as the component (A):

$$\left[ R_a^5 Si X_b^1 O_{\frac{4-a-b}{2}} \right]$$

wherein $R^5$ stands for a monovalent substituted or unsubstituted hydrocarbon group, $X^1$ is a reactive group selected from a hydroxyl group and an alkoxy group, a is a number of from 1.0 to 1.7 and b is a number of from 0 to 0.1, with the proviso that at least 2, preferably more than 2, of the $R^5$ groups are vinyl groups, on the average, in the molecule.

In order to obtain an excellent heat resistance, it is preferred that the groups $R^5$, other than the above-mentioned vinyl groups, be methyl and/or phenyl groups. The average degree of polymerization is not particularly critical, but from the viewpoint of easiness in handling, it is preferred that the average degree of polymerization be in the range of from 1 to 50.

The polyorganohydrogensiloxane (B) that is used in the present invention acts as a crosslinking agent causing hydrosilylation with the vinyl groups of the polyorganosiloxane (A). In order to form a network structure by crosslinking, it is critical that the polyorganohydrogensiloxane (B) should have at least 2 hydrogen atoms bonded to the silicon atom(s), on the average, in the molecule and, if the polyorganosiloxane (A) has only 2 vinyl groups in the molecule, for example, if vinyl groups are present only on both the terminals of the linear molecule of the polyorganosiloxane (A), the polyorganohydrogensiloxane (B) should have more than 2 hydrogen atoms bonded to the silicon atom(s), on the average, in the molecule. The said hydrogen atoms can be bonded to the same silicon atom or to different silicon atoms, in the molecule. The siloxane chain of such polyorganohydrogensiloxane can be linear, branched or cyclic. In other words, these polyorganosiloxanes can consist of siloxane units whose functionalities are the same as or different from each other. The hydrogen atoms bonded to the silicon atoms can be present on any siloxane units, including terminal, internal and branched portions. As the organic groups bonded to the silicon atoms, there can be mentioned, for example, alkyl groups such as methyl, ethyl, propyl, butyl, hexyl, octyl, decyl and dodecyl groups, a phenyl group and a β-phenylethyl group. From the viewpoints of easiness in the synthesis and the heat resistance of the cured composition, methyl and/or phenyl groups are preferred.

The polyorganohydrogensiloxane (B) is mixed in an amount of 0.1 to 30 parts by weight, per 100 parts by weight of the component (A). It is preferred that the molar ratio of hydrogen atoms bonded to the silicon atom(s) in the component (B) to vinyl groups bonded to the silicon atom(s) in the component (A) are in the range of from 0.75 to 5. If this molar ratio is outside the above-mentioned range, curing is not sufficient and a sufficient hardness cannot be obtained.

The platinum compound (C) that is used in the present invention acts as a catalyst for hydrosilylation between the polyorganosiloxane (A) and the polyorganohydrogensiloxane (B). As the platinum compound (C), there can be mentioned, for example, chloroplatinic acid, complexes formed from chloroplatinic acid and an olefin, an alkenyl group-containing silane, an alkenyl group-containing polysiloxane, cyclopropane or an alcohol, platinum-organophosphine complexes and platinumorganophosphite complexes. The valency of the central platinum atom in such platinum complexes can be 4, 2 or 0. The platinum compound (C) is used in an amount of 0.000001 to 0.1 part by weight, preferably 0.00005 to 0.01 part by weight, per 100 parts by weight of the polyorganosiloxane (A).

This catalyst is effective at high temperatures if it is used in a very minute amount in the composition of the present invention. However, if the amount of the catalyst is less than 0.000001 part by weight, the catalytic effect is poor, and the activity is readily reduced by the presence of a minute amount of an impurity. If the amount of the catalyst exceeds 0.1 part by weight, no substantial increase of the activity is attained and large amounts of the phosphorus compound and organic peroxide will be needed for increasing the stability. Furthermore, the use of the catalyst in such a large amount is not preferred from the economical viewpoint.

The phosphorus compound (D) that is used in the present invention is represented by the following general formula:

$$R_3P$$

wherein the R groups, which can be the same or different, stand for a monovalent group selected from the group consisting of a monovalent, substituted or unsubstituted, hydrocarbon group, an alkoxy group, an aryloxy group and a hydroxyl group. This phosphorus compound has the effect of controlling the catalytic activity of the platinum compound (C). As the group R, there can be mentioned, for example alkyl groups such as ethyl, butyl and hexyl groups, alkenyl groups such as vinyl and allyl groups, aryl groups such as a phenyl group, alkoxy groups such as methoxy, ethoxy and butoxy groups, aryloxy groups such as a phenoxy group, and a hydroxyl group. The phosphorus compound (D) is incorporated in an amount corresponding to at least one equivalent, preferably 2 equivalents, to the platinum atoms in the platinum compound (C). If the amount of the phosphorus compound (D) is less than one equivalent, complete control of the catalytic activity of the platinum compound at room temperatures is impossible.

The organic peroxide (E) that is used in the present invention controls the catalytic activity of the platinum compound (C) to hydrosilylation at room temperature, but under heating, this control effect is lost at the decomposition temperature thereof because of such decomposition and simultaneously, the controlling effect of the phosphorus compound (D) is lost by decomposition of the organic peroxide (E).

As the organic peroxide (E), there can be mentioned, for example, dialkyl peroxides such as di-t-butyl peroxide, 2,5-dimethyl-2,5-di-(t-butylperoxy)hexane, 2,5-dimethyl-2,5-di-(t-butylperoxy)-hexyne, dicumyl peroxide, t-butylcumyl peroxide and $\alpha,\alpha'$-bis(t-butylperoxy)-isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peracid esters such as t-butyl perbenzoate, peroxydicarbonates such as diisopropyl peroxydicarbonate and di-2-ethylhexyl peroxydicarbonate, and peroxyketals such as 1,1-di-(t-butylperoxy)cyclohexane and 1,1-di-(t-butylperoxy)-3,3,5-trimethylcyclohexane. Incidentally, an organic peroxide in which a hydroperoxide bond is present in the molecule is not suitable for attaining the objects of the present invention, because such peroxide causes foaming when the composition is cured by heating.

The organic peroxide (E) is used in an amount corresponding to at least one equivalent, preferably at least 2 equivalents, to the phosphorus compound (D). It is preferred that the amounts of the components (C), (D) and (E) must be adjusted so that the amount of the organic peroxide (E) is less than 0.1 part by weight, per 100 parts by weight of the component (A). If the amount of the component (E) is less than one equivalent to the component (D), the effect of stabilizing the catalyst and controlling the catalytic activity at room temperature is insufficient. However, if the amount of the component (E) is too large, a harmful peroxide decomposition product is left in the cured composition, causing reduction of the thermal stability of the cured composition.

It is known that when an organic peroxide is used in an amount of 0.2 to 1.0 part by weight per 100 parts by weight of the polyorganosiloxane (A), and the mixture is heated, reaction is caused between the vinyl groups and other hydrocarbon groups and, thus, the organic peroxide acts as a catalyst for effecting crosslinking of siloxane units. Furthermore, U.S. Pat. No. 2,479,374 discloses a process in which a large quantity of an organic peroxide is used as a catalyst for hydrosilylation. However, when an organic peroxide is used in such a minute amount as specified in the present invention, such crosslinking reaction or hydrosilylation does not occur, and the functional mechanism in the present invention is quite different from those in the above known reactions.

The second aspect of the present invention will now be described. The catalyst system used as the component (F) can be (1) a mixture of (a) a platinum-phosphorus complex described hereinafter and (b) an organic peroxide, (2) a reaction product of the components (a) and (b) or (3) a mixture of the mixture (1) and the reaction product (2).

The platinum-phosphorus complex (a) is a catalyst for hydrosilylation. As the complex (a), there are ordinarily used a zero-valent platinum-phosphorux complex represented by the general formula $(R_3^7P)_4Pt$, a divalent platinum-phosphorus complex represented by the general formula $(R_3^8P)_2PtX_2^2$, or a platinum-phosphorus composite complex represented by the general formula $[(R_3^9P)_4Pt][(PtX_4^3)]$. In the above general formulae, $R^7$, $R^8$ and $R^9$, which can be the same or different, stand for a monovalent group selected from a monovalent, substituted or unsubstituted hydrocarbon group, an alkoxy group and an aryloxy group, and $X^2$ and $X^3$ stand for a halogen atom. The zero-valent platinum-phosphorus complex is suitable for curing at rather lower temperatures when it is used in combination with an alkyl peroxide, and the divalent platinum-phosphorus complex and the platinum-phosphorus composite complex are excellent in the storage stability of the complex per se. As the groups $R^7$, $R^8$ and $R^9$, there can be mentioned, for example, alkyl groups such as ethyl, butyl and hexyl groups, alkenyl groups such as vinyl and allyl groups, aryl groups such as a phenyl group, alkoxy groups such as methoxy, ethoxy and butoxy groups, and aryloxy groups such as a phenoxy group. Chlorine is preferred for $X^2$ and $X^3$.

The amount used of the platinum-phosphorus complex is 0.000001 to 0.1 part by weight, preferably 0.00005 to 0.01 part by weight, per 100 parts by weight of the component (A).

The critical significance of the amount of the component (a) is the same as described hereinbefore with respect to the component (C). If necessary, the platinum-phosphorus complex can be added in the form of a solution in a solvent which can dissolve the complex.

The organic peroxide (b) is the most characteristic component in the second aspect of the present invention. More specifically, the organic peroxide (b) stabilizes the platinum-phosphorus complex (a) at room temperature and controls the catalytic activity of the complex (a) to hydrosilylation. Furthermore, under heating, the organic peroxide is decomposed at the decomposition temperature thereof to lose the catalytic activity controlling effect. Even at elevated temperatures lower than the decomposition temperature of the peroxide, the organic peroxide (b) makes a contribution to activation of the platinum-phosphorus complex (a). The same compounds as mentioned hereinbefore with respect to the component (E) of the fundamental aspect of the invention can be used as the organic peroxide (b).

The amount of the organic peroxide (b) is from 0.00001 to less than 0.1 part by weight, per 100 parts by weight of the component (A), and it is preferred that the amount of the organic peroxide (b) be from 2 to 1,000 equivalents to the platinum of the component (a). When the amount of the component (b) is smaller than 2 equivalents to the platinum of the component (a), the stabilizing and controlling effects are insufficient, and when the amount of the component (b) is larger than 1,000 equivalents to the platinum of the component (a), a harmful peroxide decomposition product is left in the cured product, causing reduction of the thermal stability thereof. From the economical viewpoint, it is especially preferred that the amount of the component (b) is from 10 to 100 equivalents to the platinum of the component (a).

As pointed out hereinbefore, a reaction product of the platinum-phosphorus complex (a) and the organic peroxide (b) can be used as the component (F). For example, a zero-valent platinum-phosphorus complex of the formula $(R_3^7P)_4Pt$ in which $R^7$ is as defined above, in the form of a solution in an ether such as ethylene glycol dimethyl ether or anisole, a solid divalent platinumphosphorus complex such as bis(triphenylphosphite)platinum dichloride, in the form of a solution in a solvent such as chloroform or carbon tetrachloride, or a liquid platinum-phosphorus complex such as bis(-tributylphosphine)platinum dichloride as it is or in the form of a solution thereof in a solvent such as toluene, is mixed with an organic peroxide in an amount of 2 to 1,000 equivalents to the platinum and the mixture is heated at 40° to 50° C., whereby the intended reaction product is obtained. The amount of the reaction product can be the sum of the above-mentioned amounts of the components (a) and (b).

The composition of the present invention is characterized in that it comprises the above-mentioned components (A) through (E) or (A), (B) and (F). In the present invention, an inorganic filler can be further mixed into the composition of the present invention so as to improve the mechanical properties of the cured composition. Any inorganic fillers generally used for shaped articles of silicone rubbers and silicone resins can be used. For example, there can be mentioned finely divided silica, surface-treated finely divided silica having the surface thereof treated with an organopolysiloxane or trimethylsilyl compound, diatomaceous earth, quartz powder, glass fiber chops, aluminum oxide, titanium oxide, iron oxide and carbon black. These inorganic fillers can be used singly or in the form of a mixture of two or more of them. It is preferred that the amount of the inorganic filler is up to 500 parts by weight, per 100 parts by weight of the component (A). If the amount of the inorganic filler exceeds this level, the cured composition is hard and brittle. When an elastomer is desired, it is preferred that the amount of the inorganic filler be up to 300 parts by weight, per 100 parts by weight of the component (A). If the amount of the inorganic filler exceeds this level, the elongation or elasticity is drastically reduced.

A heat stabilizer, a pigment and a process aid such as a low-molecular-weight polysiloxane can be added to the composition of the present invention as needed. However, it must be noted that substances that inhibit the catalytic activity of the platinum compound drastically and permanently, such as compounds of lead and tin, sulfur compounds and nitrogen compounds, should not be used as the inorganic filler or additive.

In the composition of the present invention, the platinum compound or the platinum-phosphorus complex is stabilized by using minute amounts of the phosphorus compound and organic peroxide or by using reaction with a minute amount of the organic peroxide. Accordingly, the storage stability of the composition at room temperature and the scorch resistance under processing conditions at a slightly elevated temperature can be remarkably improved over those of conventional compositions of the addition reaction type. Furthermore, if the temperature is elevated by heating the composition to the decomposition temperature of the organic peroxide, the control effect of the phosphorus compound to the platinum compound is weakened and curing is promptly advanced, even in the presence of a minute amount of the platinum compound. Furthermore, even when the composition of the present invention is heated at 170° C., it is a long time before scorching takes place. Accordingly, in the case of so-called press vulcanization for performing molding under pressure and heat by using a press, a mold can be used repeatedly without being cooled, and the process can be shortened. Moreover, when there is adopted a hot air vulcanization method in which a composition is extruded and exposed to hot air without applying pressure, because of the presence of the organic peroxide, curing of the composition is rapidly advanced at the decomposition temperature of the organic peroxide, and there is attained an advantage that bubbling or foaming is not caused.

As compared with the conventional curing mechanism ordinarily adopted for heat curing-type silicone rubbers, in which the reaction of methyl groups or the reaction of methyl groups with vinyl groups, is caused by an organic peroxide, the present invention is advantageous in that because the amount used of the organic peroxide is extremely small in the present invention, the influence of the residual decomposition product thereof on the heat resistance of the cured product and also the limitation for sanitary purposes caused by the presence of such a decomposition product can be eliminated. When the conventional curing mechanism is used for the formation of tubes by extruding, 2,4-dichlorobenzoyl peroxide should be used as the organic peroxide in a large amount, and if the decomposition product of the organic peroxide remains in the product, the product cannot be applied to fields where the product contacts foods. In contrast, in the present invention, the amount used of the organic peroxide is very small and an optionally selectable kind of the organic peroxide, for example, di-t-butyl peroxide which is regarded as producing a relatively safe decomposition product, can be used. Furthermore, as compared with the method using 2,4-dichlorobenzoyl peroxide, the present invention is advantageous in that the surface curing property is highly improved, the surface stickiness is not observed at all, and blooming of the decomposition product of the peroxide can be prevented.

In the present invention, the platinum catalyst used in combination with the organic peroxide is relatively safe and it is used only in a very minute amount. Therefore, a silicone rubber useful for making a tube suitable for sanitary purposes can be obtained according to the present invention.

The composition of the present invention is cured under good conditions even if it is heated in a closed system. Accordingly, the composition of the present invention can be used for the formation of silicone rubber molded, shaped and potted articles and silicone resin molded articles, impregnation of coils and inorganic materials and manufacture of laminated plates. Furthermore, because a good cured product or cured film is obtained from the composition of the present invention by heating in air, the composition of the present invention is suitable for silicone rubber coating of wires and tubes, and other continuous processing, such as silicone resin coating or mica treatment.

The present invention will now be described in more detail with reference to the following illustrative Examples, in which all mentions of "parts" mean parts by weight. When no specific description is given, the viscosity of the fluid or a mixture thereof, or other physical properties of the obtained elastomers are shown as measured at 25° C. For simplification, the following abbreviations are used in the Examples.

Me: methyl
Ph: phenyl
Et: ethyl
Vi: vinyl
Bu: butyl

EXAMPLE 1

100 parts of a trimethylsilyl terminated methylvinyl polysiloxane consisting of 99.8 mole % of dimethylsiloxy units and 0.2 mole % of methylvinylsiloxy units and having a degree of polymerization of about 6,000, 50 parts of siloxane-treated fumed silica and 3 parts of α,ω-dihydroxypolydimethylsiloxane having a viscosity of 50 cSt as a process aid were thoroughly mixed by a dough mixer, and 5 parts of a trimethylsilyl terminated poly(methylhydrogensiloxane) were added to 100 parts of the mixture by means of a roll to obtain a base composition. Various catalyst systems, listed in Table 1, were added separately to the base composition to obtain compositions Nos. 11 to 16. Compositions Nos. 11, 13 and 15 are comparative compositions.

TABLE 1

| Composition No. | Platinum Compound Kind | Amount (ppm) | Phosphorus Compound Kind | Amount (ppm) | Organic Peroxide Kind | Amount (ppm) |
| --- | --- | --- | --- | --- | --- | --- |
| 11 (comparison) | $H_2PtCl_6 \cdot 6H_2O$ | 2 | $P(OPh)_3$ | 1.2 | none | 0 |
| 12 (invention) | " | 2 | " | 1.2 | 2,5-dimethyl-2,5-di-(t-butyl-peroxy)hexane | 4.5 |
| 13 (comparison) | " | 2 | " | 12 | none | 0 |
| 14 (invention) | " | 2 | " | 12 | 2,5-dimethyl-2,5-di-(t-butyl-peroxy)hexane | 22.5 |
| 15 (comparison) | " | 2 | " | 120 | none | 0 |
| 16 (invention) | " | 2 | " | 120 | 2,5-dimethyl-2,5-di-(t-butyl-peroxy)hexane | 225 |

With respect to each of the thus obtained compositions, the storage stability at 50° C. was determined, and the $T_{90}$ and torque were measured when the curing property was examined at 170° C. by using Curastometer JSR (trademark for the curability tester manufactured by Imanaka Kikai Koygo K. K.). Furthermore, the compositions of the present invention were press-cured at 180° C. for 10 minutes and post-cured at 200° C. for 4 hours to obtain silicone rubber sheets having a thickness of 2 mm. The physical properties of the sheets were measured according to JIS K 6301. The obtained results are shown in Table 2.

TABLE 2

| Composition No. | 11 (comparison) | 12 (invention) | 13 (comparison) | 14 (invention) | 15 (comparison) | 16 (invention) |
| --- | --- | --- | --- | --- | --- | --- |
| Storage stability (50° C.) | gelled in 3 hours | gelled after 3 days | gelled after 3 days | gelled after 10 days | stable for 30 days | stable for 30 days |
| $T_{90}$(170° C.) (s) | 55.7 | 65.8 | 1800 | 81.8 | measurement im- | 92.0 |

TABLE 2-continued

| Composition No. | 11 (comparison) | 12 (invention) | 13 (comparison) | 14 (invention) | 15 (comparison) | 16 (invention) |
|---|---|---|---|---|---|---|
| Torque (170° C.) (kg . cm) | 52.0 | 55.4 | 45.0 | 47.6 | possible not increased | 54.8 |
| Hardness (JIS) | | 60 | | 62 | | 59 |
| Tensile strength (kg/cm$^2$) | | 78 | | 85 | | 80 |
| Elongation (%) | | 360 | | 340 | | 360 |
| Tear strength (kg/cm) (B type) | | 24 | | 24 | | 26 |

EXAMPLE 2

A polysiloxane mixture was obtained by mixing 100 parts of a vinyldimethylsilyl group terminal blocked polydimethylsiloxane having a viscosity of 3,200 cSt with 1.0 part of a trimethylsilyl group terminal blocked polymethylhydrogensiloxane consisting of 60 mole % of methylhydrogensiloxy units and 40 mole % of dimethylsiloxy units and having a degree of polymerization of 40. Catalysts systems indicated in Table 3 were incorporated separately into samples of the mixture to obtain composition No. 21, according to the present invention, and comparative compositions Nos. 22 to 24.

TABLE 3

| Composition No. | Platinum Compound | | Phosphorus Compound | | Organic Peroxide | |
|---|---|---|---|---|---|---|
| | Kind | Amount (ppm) | Kind | Amount (ppm) | Kind | Amount (ppm) |
| 21 (invention) | {[(EtO)$_3$P]$_4$Pt}{PtCl$_4$} | 5 | n-Bu$_3$P | 2.6 | benzoyl peroxide | 6.3 |
| 22 (comparison) | " | 5 | none | 0 | none | 0 |
| 23 (comparison) | " | 5 | n-Bu$_3$P | 2.6 | none | 0 |
| 24 (comparison) | " | 5 | none | 0 | benzoyl peroxide | 6.3 |

With respect to each of the thus obtained compositions, the change of the viscosity at 50° C. and the curing property at 120° C. were examined. The obtained results are shown in Table 4.

TABLE 4

| Composition No. | 21 (invention) | 22 (comparison) | 23 (comparison) | 24 (comparison) |
|---|---|---|---|---|
| Change in Viscosity (50° C.) | | | | |
| Initial Viscosity (cSt) | 3,000 | 3,010 | 3,120 | 3,400 |
| Viscosity after 1 day (cSt) | 3,000 | 3,900 | 3,130 | 3,450 |
| Viscosity after 10 days (cSt) | 3,000 | —*1 | 3,130 | —*2 |
| Curing Property (120° C.) | cured in 10 minutes | cured in 1 hour | not cured after 1 day | cured in 10 minutes |

Note
*1: cured after 7 days
*2: cured after 9 days

EXAMPLE 3

100 parts of a vinyldimethylsilyl terminated polymethylvinylsiloxane consisting of 99.85 mole % of dimethylsiloxy units and 0.15 mole % of methylvinylsiloxy units and having a degree of polymerization of about 5,000, 30 parts of fumed silica and 2 parts of α,ω-dihydroxypolymethylphenylsiloxane consisting of 30 mole % of diphensylsiloxy units and 70 mole % of dimethylsiloxy units and having a viscosity of 40 cSt as a process aid were mixed by a dough mixer. Then, 1.2 parts of a dimethylhydrogensilyl group terminal blocked polymethylhydrogensiloxane consisting of 50 mole % of methylhydrogensiloxy units and 50 mole % of dimethylsiloxy units and having a degree of polymerization of 30 was added to the mixture to obtain a base composition. The catalyst systems shown in Table 5 were added to separate samples of the resulting base composition to form compositions Nos. 31 and 32.

TABLE 5

| Composition No. | Platinum Compound | | Phosphorus Compound | | Organic Peroxide | |
|---|---|---|---|---|---|---|
| | Kind | Amount (ppm) | Kind | Amount (ppm) | Kind | Amount (ppm) |
| 31 | Pt$_2$[(Me$_2$ViSi)$_2$O]$_3$ | 10 | n-Bu$_2$POH | 17 | t-butylcumyl | 110 |

TABLE 5-continued

| Composition No. | Platinum Compound | | Phosphorus Compound | | Organic Peroxide | |
|---|---|---|---|---|---|---|
| | Kind | Amount (ppm) | Kind | Amount (ppm) | Kind | Amount (ppm) |
| 32 | " | 10 | " | 170 | peroxide " | 880 |

With respect to each of the thus obtained compositions, the storage stability and the curing property at 170° C. measured by Curastometer JSR (trademark for a curability tester, manufactured by Imanaka Kikai Kogyo K.K.) were examined. The obtained results are shown in Table 6.

TABLE 6

| Composition No. | 31 | 32 |
|---|---|---|
| Storage stability (50° C.) | gelled after 7 days | stable for more than 30 days |
| $T_{90}$ (170° C.) (s) | 63.0 | 76.0 |
| Torque (kg/cm) (170° C., 20 minutes) | 40.8 | 39.6 |

EXAMPLE 4

100 parts of a vinyldimethylsilyl terminated polymethylvinylsiloxane consisting of 99.9 mole % of dimethylsiloxy units and 0.1 mole % of methylvinylsiloxy units and having a degree of polymerization of about 7,000, 40 parts of siloxane-treated fumed silica, 22 parts of diatomaceous earth and 2 parts of the same process aid as used in Example 3 were thoroughly mixed by a dough mixer. Then, 4 parts of the same polymethylhydrogensiloxane as used in Example 1 was added to 100 parts of the thus obtained mixture to obtain a base composition. Eight (8) ppm of a chloroplatinic acid-octene complex obtained by heating chloroplatinic acid and octanol, 20.3 ppm of (EtO)$_3$P and an organic peroxide shown in Table 7 were added to the base composition. Thus, compositions Nos. 41 to 45 were prepared. Each composition was divided into 10 portions and they were press-cured for 10 minutes by using presses maintained at temperatures of 90° to 180° C. at intervals of 10° C., respectively. The lowest temperature that provided a good silicone rubber sheet is shown as the curing temperature in Table 7. The order of press curing at the respective temperatures was random, and the mold was not particularly cooled at each pressing, but scorching was not caused in any sample.

TABLE 7

| Composition No. | Organic Peroxide | | Curing Temperature (°C.) |
|---|---|---|---|
| | Kind | Amount (ppm) | |
| 41 | benzoyl peroxide | 41 | 100 |
| 42 | di-t-butyl peroxide | 25 | 160 |
| 43 | p-chlorobenzoyl peroxide | 47 | 90 |
| 44 | 1,1-bis(t-butyl-peroxy)-3,3,5-trimethylcyclohexane | 49 | 140 |
| 45 | 2,5-dimethyl-2,5-di-(t-butylperoxy)-hexane | 51 | 160 |

EXAMPLE 5

100 parts of a vinyldimethylsilyl terminated polydimethylsiloxane having a viscosity of 550 cSt at 25° C., 3 parts of a polymethylhydrogensiloxane, 150 parts of quartz powder having a particle size of 5μ and 4 parts of iron oxide were mixed to obtain a base composition. The polymethylhydrogensiloxane used consisted of (CH$_3$)$_2$HSiO$_{\frac{1}{2}}$ units and SiO$_2$ units and contained 0.8% by weight of hydrogen atoms bonded to the silicon atoms, and it had a viscosity of 20 cSt at 25° C. Then, 5 ppm of a platinum-methylvinylsiloxane complex obtained by heating chloroplatinic acid and tetravinyltetramethylcyclotetrasiloxane, 19.2 ppm of n-Bu$_3$P and 80 ppm of 1,1-bis(t-butylperoxy)-3,3,5-trimethylcyclohexane were added to the base composition to form a test composition. When this test composition was stored at 50° C. for 1 month, the appearance of the composition was not changed. The as-prepared composition and the composition stored at 50° C. for 1 month were cast in a thickness of 2 mm between two phenolic resin sheets and were heated at 150° C. for 10 minutes. In each case, a good elastomer was obtained. The physical properties were tested according to JIS K 6301. The results shown in Table 8 were obtained.

TABLE 8

| | Sample | |
|---|---|---|
| | just after preparation | after storing at 50° C. for 1 month |
| Hardness (JIS) | 63 | 60 |
| Tensile strength (kg/cm$^2$) | 35 | 36 |

EXAMPLE 6

135 parts of phenyltrichlorosilane, 25 parts of vinyltriethoxysilane and 40 parts of α,ω-dichloropoly(dimethylsiloxane) having an average degree of polymerization of 15 were dissolved in 100 parts of toluene, and the solution was added dropwise over a period of 15 minutes to a liquid mixture of 200 parts of toluene and 300 parts of water, which was being agitated. The mixture was further agitated for 15 minutes to effect hydrolysis. Neutralization, water washing, dehydration and filtration were carried out by the conventional procedures. Then, 0.06 part of potassium hydroxide was added to the recovered hydrolyzate mixture, and it was heated at the reflux temperature of toluene for 1 hour while water formed by condensation was removed. The reaction mixture was cooled, neutralized with an aqueous solution of acetic acid, dehydrated and filtered, and excess toluene was removed by distillation under reduced pressure to obtain a toluene solution of a polyorganosiloxane substantially free of hydroxyl groups, which had a non-volatile component content of 60%. Then, 16 parts of the same polymethylhydrogensiloxane as used in Example 3 and 10 ppm of the same platinum complex as used in Example 4 were added to the solution. Then, 33.2 ppm of (n-BuO)$_3$P and 96 ppm of 2,5-dimethyl-2,5-di-(t-butylperoxy)-hexane were further added to the mixture to form a silicone varnish. The varnish was coated on a glass cloth and predried at 100° C. for 10 minutes to obtain a prepreg. The thus prepared prepregs were piled and the assembly was pressed at a temperature of 170° C. under a pressure of 50 kg/cm². The prepreg was completely cured and a silicone-glass cloth laminated plate was obtained.

EXAMPLE 7

100 parts of a trimethylsilyl terminated methylvinyl polysiloxane consisting of 99.8 mole % of dimethylsiloxy units and 0.2 mole % of methylvinylsiloxy units and having a degree of polymerization of about 6,000, 50 parts of siloxane-treated fumed silica and 3 parts of α,ω-dihydroxypolydimethylsiloxane having a viscosity of 50 cSt as a processing aid were thoroughly mixed by a dough mixer, and 5 parts of a trimethylsilyl group terminated poly(methylhydrogensiloxane) was added to 100 parts of the mixture by means of a roll to obtain a base composition. The catalyst systems shown in Table 9 were separately added to samples of the base composition to obtain compositions Nos. 51 to 54. Compositions Nos. 51 and 52 are comparative compositions.

When the platinum (zero valent)-phosphorus complex was storaged at 50° C. for one month without the presence of an organic peroxide, it grew brownish because of its decomposition and lost the processability in the curing step. Contrary to that, the composition of the invention does not lose the stability and processability.

TABLE 10

| Composition No. | 51 (comparison) | 52 (comparison) | 53 (invention) | 54 (invention) |
|---|---|---|---|---|
| Storage stability (50° C.) | gelled after 2 days | gelled in 3 hours | gelled after 5 days | gelled after 5 days |
| $T_{90}$(170° C.) (s) | 252.5 | 119.0 | 258.0 | 240.9 |
| $T_{10}$(170° C.) (s) | 12.0 | 11.3 | 62.8 | 60.1 |
| Hot air curing (200° C., 5 min) | not foamed | not foamed | not foamed | not foamed |
| Hardness (JIS) | | | 61 | 62 |
| Tensile strength (kg/cm²) | | | 79 | 88 |
| Elongation (%) | | | 350 | 340 |
| Tear strength (kg/cm) (B type) | | | 27 | 25 |

EXAMPLE 8

TABLE 9

| Composition No. | Platinum-Phosphorus Complex | | Organic Peroxide | | Remarks |
|---|---|---|---|---|---|
| | Kind | Amount (ppm) | Kind | Amount (ppm) | |
| 51 (comparison) | [(PhO)₃P]₄Pt | 10 | none | 0 | aged at 25° C. for 1 day after synthesis. |
| 52 (comparison) | [(PhO)₃P]₄Pt | 10 | none | 0 | aged at 50° C. for 1 month after synthesis and grew brownish. |
| 53 (invention) | [(PhO)₃P]₄Pt | 10 | 2,5-dimethyl-2,5-di-(t-butylperoxy)-hexyne | 20 | platinum-phosphorus complex which had aged at 25° C. for 1 day after synthesis and organic peroxide were added separately. |
| 54 (invention) | [(PhO)₃P]₄Pt | 10 | 2,5-dimethyl-2,5-di-(t-butylperoxy)-hexyne | 20 | platinum-phosphorus complex which had aged at 25° C. for 1 day after synthesis was mixed with organic peroxide and the mixture was placed at 50° C. for 1 month |

With respect to each of the thus-obtained compositions, the storage stability at 50° C. was determined, and the $T_{90}$, $T_{10}$ and foaming at hot air curing were measured when the curing property was examined at 170° C. by using Curastometer JSR (trademark for the curability tester manufactured by Imanaka Kikai Kogyo K.K.). Furthermore, the compositions of the present invention were press-cured at 180° C. for 10 minutes and post-cured at 200° C. for 4 hours to obtain silicone rubber sheets having a thickness of 2 mm. The physical properties of the sheets were measured according to JIS K 6301. The obtained results are shown in Table 10.

A polysiloxane mixture was obtained by mixing 100 parts of a vinyldimethylsilyl terminated polydimethylsiloxane having a viscosity of 3,200 cSt with 1.0 part of a trimethylsilyl terminated polymethylhydrogensiloxane consisting of 60 mole % of methylhydrogensiloxy units and 40 mole % of dimethylsiloxy units and having a degree of polymerization of 40. The catalyst systems indicated in Table 11 were mixed separately into samples of the mixture to obtain compositions Nos. 63 to 66 according to the present invention and comparative compositions Nos. 61 and 62.

TABLE 11

| Composition No. | Platinum-Phosphorus Complex | | Organic Peroxide | |
|---|---|---|---|---|
| | Kind | Amount (ppm) | Kind | Amount (ppm) |
| 61 (comparison) | [(MeO)₃P]₄Pt | 10 | none | 0 |
| 62 (comparison) | [(n-BuO)₃P]₂PtCl₂ | 10 | none | 0 |
| 63 (invention) | [(MeO)₃P]₄Pt | 10 | 1,1-bis(t-butylperoxy)-3,3,5-trimethyl- | 50 |

TABLE 11-continued

| Composition No. | Platinum-Phosphorus Complex Kind | Amount (ppm) | Organic Peroxide Kind | Amount (ppm) |
|---|---|---|---|---|
| 64 (invention) | [(n-BuO)$_3$P]$_2$PtCl$_2$ | 10 | cyclohexane 1,1-bis(t-butylperoxy)-3,3,5-trimethyl-cyclohexane | 50 |
| 65 (invention) | [Et$_3$P]$_4$Pt | 10 | 1,1-bis(t-butylperoxy)-3,3,5-trimethyl-cyclohexane | 50 |
| 66 (invention) | [Bu$_3$P]$_2$PtCl$_2$ | 10 | 1,1-bis(t-butylperoxy)-3,3,5-trimethyl-cyclohexane | 20 |

With respect to each of the thus-obtained compositions, the change of the viscosity at 50° C. and the curing property at 150° C. were examined. The obtained results are shown in Table 12.

TABLE 12

| Composition No. | 61 (comparison) | 62 (comparison) | 63 (invention) | 64 (invention) | 65 (invention) | 66 (invention) |
|---|---|---|---|---|---|---|
| Change of Viscosity (50° C.) | | | | | | |
| Initial viscosity (cSt) | 3,400 | 3,410 | 3,550 | 3,600 | 3,500 | 3,350 |
| Viscosity after 1 day (cSt) | 6,200 | 3,900 | 3,450 | 3,610 | 3,900 | 3,350 |
| Viscosity after 10 days (cSt) | —*1 | —*2 | —*3 | 3,610 | —*4 | 3,350 |
| Curing Property (150° C.) | cured in 10 minutes | cured in 15 minutes | cured in 8 minutes | cured in 12 minutes | cured in 4 minutes | cured in 8 minutes |

Note
*1: cured after 2 days
*2: cured after 7 days
*3: cured after 8 days
*4: cured after 7 days

EXAMPLE 9

100 parts of a vinyldimethylsilyl terminated polymethylvinylsiloxane consisting of 99.85 mole % of dimethylsiloxy units and 0.15 mole % of methylvinylsiloxy units and having a degree of polymerization of about 5,000, 30 parts of fumed silica and 2 parts of α,ω-dihydroxypolymethylphenylsiloxane consisting of 30 mole % of diphenylsiloxy units and 70 mole % of dimethylsiloxy units and having a viscosity of 40 cSt as a process aid were mixed by a dough mixer. Then, 1.2 parts of a dimethylhydrogensilyl group terminal blocked polymethylhydrogensiloxane consisting of 50 mole % of methylhydrogensiloxy units and the balance dimethylsiloxy units and having a degree of polymerization of 30 was added to the mixture to obtain a base composition. The catalyst systems shown in Table 13 were added separately to samples of the resulting base composition to form comparative compositions Nos. 71 and 72 and composition No. 73 of the present invention.

TABLE 13

| Composition No. | Platinum-Phosphorus Complex Kind | Amount (ppm) | Organic Peroxide Kind | Amount (ppm) |
|---|---|---|---|---|
| 71 (comparison) | none | 0 | di-t-butyl-peroxide | 8 |
| 72 (comparison) | [(PhO)$_3$P]$_2$PtCl$_2$ | 4 | none | 0 |
| 73 (invention) | [(PhO)$_3$P]$_2$PtCl$_2$ | 4 | di-t-butyl-peroxide | 8 |

With respect to each of the thus-obtained compositions, the curing property at 170° C. measured by Curastometer JSR (trademark for a curability tester manufactured by Imanaka Kikai Kogyo K.K.) was examined. The results shown in Table 14 were obtained. Comparative composition No. 71 was not cured, and comparative composition No. 72 was not sufficiently cured. In composition No. 73, since the organic peroxide attacked the ligand of the platinum-phosphorus complex whereby to activate platinum, a good curing property was obtained.

TABLE 14

| Composition No. | 71 (comparison) | 72 (comparison) | 73 (invention) |
|---|---|---|---|
| T$_{90}$ (170° C.) (s) | — | ∞ | 682.2 |
| T$_{10}$ (170° C.) (s) | — | ∞ | 150.4 |
| Torque (kg · cm) (170° C., 20 min) | 0 | 25.4 | 42.2 |

EXAMPLE 10

10 ppm of {[(EtO)$_3$P]$_4$Pt}{PtCl$_4$} and 20 ppm of 2,5-dimethyl-2,5-di-(t-butylperoxy)hexane were added to the base composition prepared in Example 9, and the composition was press-cured at 170° C. for 10 minutes. A good silicone rubber was obtained.

EXAMPLE 11

100 parts of a vinyldimethylsilyl terminated polymethylvinylsiloxane consisting of 99.9 mole % of dimethylsiloxy units and 0.1 mole % of methylvinylsiloxy units and having a degree of polymerization of about 7,000, 40 parts of siloxane-treated fumed silica, 22 parts of diatomaceous earth and 2 parts of the same process aid as used in Example 9 were thoroughly kneaded by a dough mixer. Then, 4 parts of the same polymethylhydrogensiloxane as used in Example 7 was added to 100 parts of the thus-obtained mixture to obtain a base composition, and 10 ppm of $[(n-BuO)_3P]_4Pt$ and an organic peroxide shown in Table 15 were added to the base composition. Thus, test compositions Nos. 81 to 84 were prepared. Each test composition was divided into 10 portions and they were press-cured for 10 minutes by using presses maintained at temperatures of 90° to 180° C. at intervals of 10° C., respectively. The lowest temperature that provided a good silicone rubber sheet is shown as the curing temperature in Table 15. The order of press curing at the respective temperatures was random, and the mold was not specially cooled at every pressing and thus scorching was not caused in any sample.

TABLE 15

| Composition No. | Organic Peroxide Kind | Amount (ppm) | Curing Temperature (°C.) |
|---|---|---|---|
| 81 | benzoyl peroxide | 20 | 100 |
| 82 | p-chlorobenzoyl peroxide | 20 | 90 |
| 83 | 1,1-bis(t-butyl-peroxy)-3,3,5-trimethylcyclohexane | 40 | 140 |
| 84 | 2,5-dimethyl-2,5-di-(t-butylperoxy)-hexane | 20 | 160 |

EXAMPLE 12

100 parts of a trimethylsilyl terminated polydiorganosiloxane consisting of 94.8 mole % of dimethylsiloxy units, 0.2 mole % of methylvinylsiloxy units and 5 mole % of diphenylsiloxy units and having a degree of polymerization of about 6,000, 40 parts of fumed silica and 2 parts of the same process aid as used in Example 9 were thoroughly mixed by a dough mixer. 5 parts of the same polymethylhydrogensiloxane as used in Example 7 was added to 100 parts of the thus-formed mixture to obtain a base composition. Then, 10 ppm of $[Ph_3P]_4Pt$ and 30 ppm of 1,1-bis(t-butylperoxy)-3,3,5-trimethylcyclohexane were added to the thus-formed base composition to obtain a test composition. The test composition was press-cured at 150° C. for 10 minutes. A good silicone rubber was obtained. When the composition was allowed to stand at 50° C. for 10 days and then cured under the same conditions as described above, a good silicone rubber was similarly obtained.

EXAMPLE 13

100 parts of a trimethylsilyl terminated polydiorganosiloxane consisting of 65 mole % of dimethylsiloxy units, 33 mole % of methyldodecylsiloxy units and 1 mole % of dimethylvinylsiloxy units and having a degree of polymerization of about 200 was thoroughly mixed with 7 parts of

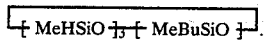

Then, 10 ppm of $[(n-BuO)_3P]_4Pt$ and 40 ppm of a mixture of 50% of benzoyl peroxide and 50% of dimethylsilicone fluid were added to the thus-formed mixture to obtain a composition. When the composition was allowed to stand at 50° C. for 10 minutes, no substantial change in the viscosity was observed. The as-prepared composition and the same composition which had been allowed to stand still at 50° C. for 10 days were heated at 120° C. for 1 hour. In each case, a cured elastomer was obtained.

EXAMPLE 14

100 parts of a vinyldimethylsilyl terminated polydimethylsiloxane having a viscosity of 550 cSt at 25° C., 3 parts of a polymethylhydrogensiloxane, 150 parts of quartz powder having a particle size of 5μ and 4 parts of iron oxide were mixed to obtain a base composition. The polymethylhydrogensiloxane used consisted of $(CH_3)_2HSiO_{\frac{1}{2}}$ units and $SiO_2$ units and contained 0.8 % by weight of hydrogen atoms bonded to the silicon atoms, and it had a viscosity of 20 cSt at 25° C. Then, 10 ppm of $[(n-BuO)_3P]_2PtCl_2$ and 50 ppm of a mixture of 50% of benzoyl peroxide and 50% of dimethylsilicone fluid were added to the base composition to form a test composition. When this test composition was stored at 50° C. for 1 month, the appearance of the composition was not changed. The as-prepared composition and the same composition which had been stored at 50° C. for 1 month were cast in a thickness of 2 mm between two phenolic resin sheets and were heated at 120° C. for 10 minutes. In each case, a good elastomer was obtained. The physical properties were tested according to JIS K 6301. The results shown in Table 16 were obtained.

TABLE 16

| | Sample | |
|---|---|---|
| | just after preparation | after standing at 50° C. for 1 month |
| Hardness | 65 | 62 |
| Tensile strength (kg/cm²) | 32 | 36 |

EXAMPLE 15

135 parts of phenyltrichlorosilane, 25 parts of vinyltriethoxysilane and 40 parts of α,ω-dichloropoly(dimethylsiloxane) having an average degree of polymerization of 15 were dissolved in 100 parts of toluene, and the solution was added dropwise over a period of 15 minutes to a liquid mixture of 200 parts of toluene and 300 parts of water, which was being agitated. The mixture was further agitated for 15 minutes to effect hydrolysis. Neutralization, water washing, dehydration and filtration were carried out by the conventional procedures. Then, 0.06 parts of potassium hydroxide was added to the recovered hydrolyzate mixture, and it was heated at the reflux temperature of toluene for 1 hour while the water formed by the condensation was removed. The reaction mixture was cooled, neutralized with an aqueous solution of acetic acid, dehydrated and filtered, and excess toluene was removed by distillation under reduced pressure to obtain a toluene solution of a polyorganosiloxane substantially free of a hydroxyl group, which had a non-volatile component content of 60%. Then, 16 parts of the same polymethylhydrogensiloxane as used in Example 9 was added to the solution, and 10 ppm of [(PhO)$_3$P]$_4$Pt and 25 ppm of 2,5-dimethyl-2,5-di-(t-butylperoxy)hexane were further added to the mixture to form a silicone varnish. The varnish was coated on a glass cloth and pre-dried at 100° C. for 10 minutes to obtain a prepreg. The thus-prepared prepregs were piled up and the assembly was pressed at a temperature of 170° C. under a pressure of 50 kg/cm$^2$. The prepreg was completely cured and a silicone-glass cloth laminated plate was obtained.

EXAMPLE 16

84 parts of methyltrichlorosilane, 76 parts of phenyltrichlorosilane, 12 parts of diphenyldichlorosilane and 37 parts of methylvinyldichlorosilane were incorporated in 125 parts of toluene, and the mixture was added dropwise over a period of 15 minutes to a liquid mixture of 120 parts of toluene, 120 parts of acetone and 530 parts of water, which was being agitated vigorously. The resulting mixture was further agitated for 15 minutes to effect hydrolysis. Neutralization, water washing, dehydration and filtration were carried out by conventional procedures, and then 0.05 part of potassium hydroxide was added to the recovered mixture, and the mixture was heated for 3 hours at the reflux temperature of toluene to effect condensation, while the water formed by the condensation was removed. The reaction mixture was cooled, neutralized with an aqueous solution of acetic acid, dehydrated and filtered. Toluene was removed by heating and distillation under reduced pressure and the residue was naturally cooled to room temperature to obtain a transparent solid silicone resin. 100 parts of the thus-obtained silicone resin was sufficiently pulverized and mixed thoroughly with 30 parts of a vinyldimethylsilyl terminated polydiorganosiloxane consisting of 33 mole % of diphenylsiloxy units and 67% of dimethylsiloxy units and having an average degree of polymerization of 20, 320 parts of pulverized quartz and 130 parts of glass staple fiber chips at 100° C. Then, 110 parts of the same polymethylhydrogensiloxane as used in Example 9 was added to the mixture to form a base composition. Then, 10 ppm of the same platinum-phosphorus complex as used in Example 10 and 30 ppm of t-butylcumyl peroxide were added to the base composition, and the composition was mixed by a blender. The resulting composition was molded at 180° C. under a pressure of 60 kg/cm$^2$ and then post-cured at 200° C. for 2 hours. A good molded article was obtained.

The embodiments of the invention in which an exclusive property or privilege is claimed are defined as follows:

1. A curable polysiloxane composition consisting essentially of (A) 100 parts by weight of polyorganosiloxane having at least 2 vinyl groups bonded to silicon atom(s), on the average, in the molecule, (B) 0.1 to 30 parts by weight of polyorganohydrogensiloxane having at least 2 hydrogen atoms bonded to silicon atom(s), on the average, in the molecule, with the proviso that if the polyorganosiloxane (A) has only 2 vinyl groups bonded to silicon atom(s), on the average, in the molecule, more than 2 hydrogen atoms bonded to the silicon atom(s) are present, on the average, in the molecule of (B), (C) 0.000001 to 0.1 part by weight of platinum compound effective as a catalyst for reacting said polyorganosiloxane with said polyorganohydrogensiloxane, (D) phosphorus compound having the formula:

$$PR_3$$

in which the R groups, which can be the same or different, are monovalent groups selected from the group consisting of substituted or unsubstituted, hydrocarbon groups, alkoxy groups, aryloxy groups and hydroxyl groups, the amount of said phosphorus compound being at least one equivalent to the platinum atoms in the platinum compound (C), and (E) an organic peroxide having no hydroperoxy group in the molecule, the amount of said organic peroxide being at least one equivalent to the phosphorus compound (D) and less than 0.1 part by weight, per 100 parts by weight of component (A).

2. A composition as set forth in claim 1 wherein the organic groups bonded to the silicon atoms in the component (A) are monovalent substituted or unsubstituted hydrocarbon groups selected from the group consisting of alkyl, vinyl, phenyl, and 3,3,3-trifluoropropyl groups, and at least two of said organic groups, on the average, in the molecule are vinyl groups.

3. A composition as set forth in claim 1 wherein the component (A) has the formula:

$$R^2[R_2^1SiO]_nSiR_2^1R^2$$

in which $R^1$ is a monovalent, substituted or unsubstituted, hydrocarbon group, at least 85 mole % of which are methyl groups and 0.01 to 2 mole % of which are vinyl groups, $R^2$ is a monovalent group selected from the group consisting of methyl, vinyl and hydroxyl groups, and n is a number of 1,000 to 10,000.

4. A composition as set forth in claim 1 wherein the component (A) has the formula:

$$R^4[R_2^3SiO]_mSiR_2^3R^4$$

wherein $R^3$ is a monovalent, substituted or unsubstituted, hydrocarbon group, at least 65 mole % of which are methyl groups, $R^4$ is a monovalent group selected from the group consisting of methyl and vinyl groups, and the value of m is from 50 to 1,000.

5. A composition as set forth in claim 4 wherein $R^4$ is vinyl.

6. A composition as set forth in claim 4 wherein $R^3$ is methyl, $R^4$ is vinyl, and in said polyorganohydrogensiloxane (B) the number of hydrogen atoms bonded to the silicon atoms is more than 2, on the average, in the molecule.

7. A composition as set forth in claim 1 wherein the component (A) has structural units of the following average unit formula:

$$\left[ R_a^5 Si X_b O_{\frac{4-a-b}{2}} \right]$$

wherein $R^5$ is a monovalent, substituted or unsubstituted, hydrocarbon group, X is a reactive group selected from hydroxyl and alkoxy, a is a number of from 1.0 to 1.7, and b is a number of from 0 to 0.1.

8. A composition as set forth in claim 1 wherein the amount of the component (B) is 0.1 to 10 parts by weight, and the ratio of the mole number of hydrogen atoms bonded to the silicon atom(s) in the component (B) to the mole number of vinyl atoms bonded to the silicon atom(s) in the component (A) is in the range of from 0.75 to 5.

9. A composition as set forth in claim 1 wherein the amount of the component (C) is 0.00005 to 0.01 part by weight.

10. A composition as set forth in claim 1 wherein the amount of the component (D) is at least 2 equivalents to the platinum atoms of the component (C).

11. A composition as set forth in claim 1 which further comprises an inorganic filler in an amount of up to 500 parts by weight per 100 parts by weight of the component (A).

12. A curable polysiloxane composition consisting essentially of (A) 100 parts by weight of polyorganosiloxane having at least 2 vinyl groups bonded to silicon atom(s), on the average, in the molecule, (B) 0.1 to 30 parts by weight of polyorganohydrogensiloxane having at least 2 hydrogen atoms bonded to silicon atom(s), on the average, in the molecule, with the proviso that if the polyorganosiloxane (A) has only 2 vinyl groups bonded to silicon atom(s), on the average, in the molecule, more than 2 hydrogen atoms bonded to silicon atom(s) are present, on the average, in the molecule of (B), and (F) a catalyst system selected from the group consisting of (1) a mixture comprising (a) 0.000001 to 0.1 part by weight of a platinum-phosphorus complex effective as a catalyst for reacting said polyorganosiloxane and saidpolyorganohydrogensiloxane, and (b) 0.00001 to less than 0.1 part by weight of an organic peroxide having no hydroperoxy groups in the molecule, (2) a reaction product of the components (a) and (b) and (3) a mixture of (1) and (2).

13. A composition as set forth in claim 12 wherein the organic groups bonded to the silicon atoms in the component (a) are monovalent, substituted or unsubstituted hydrocarbon groups selected from the group consisting of alkyl, vinyl, phenyl and 3,3,3-trifluoropropyl groups, and at least two of said organic groups, on the average, in the molecule are vinyl groups.

14. A composition as set forth in claim 12 wherein the component (A) has the formula:

R$^2$[R$_2^1$SiO]$_n$SiR$_2^1$R$^2$ in which R$^1$ is a monovalent, substituted or unsubstituted, hydrocarbon group, at least 85 mole % of which are methyl groups and 0.01 to 2 mole % of which are vinyl groups, R$^2$ is a monovalent group selected from the group consisting of methyl, vinyl and hydroxyl groups, and n is a number of 1,000 to 10,000.

15. A composition as set forth in claim 12 wherein the component (A) has the formula:

R$^4$[R$_2^3$SiO]$_m$SiR$_2^3$R$^4$ wherein R$^3$ is a monovalent, substituted or unsubstituted, hydrocarbon group, at least 65 mole % of which are methyl groups, R$^4$ is a monovalent group selected from the group consisting of methyl and vinyl groups, and the value of m is from 50 to 1,000.

16. A composition as set forth in claim 15 wherein R$^4$ is vinyl.

17. A composition as set forth in claim 15 wherein R$^3$ is methyl, R$^4$ is vinyl, and in said polyorganohydrogensiloxane the number of hydrogen atoms bonded to the silicon atom(s) is larger than 2, on the average, in the molecule.

18. A composition as set forth in claim 12 wherein the amount of the component (B) is 0.1 to 10 parts by weight, and the ratio of the mole number of hydrogen atoms bonded to the silicon atom(s) in the component (B) to the mole number of vinyl atoms bonded to the silicon atom(s) in the component (A) is in the range of from 0.75 to 5.

19. A composition as set forth in claim 12 wherein the component (A) has structural units having the following average unit formula:

wherein R$^5$ is a monovalent, substituted or unsubstituted, hydrocarbon group, X$^1$ is a reactive group selected from hydroxyl and hydroxy, a is a number of from 1.0 to 1.7, and b is a number of from 0 to 0.1.

20. A composition as set forth in claim 19 wherein R$^5$ consists of at least 2 vinyl groups, on the average, in the molecule and the remainder are methyl and/or phenyl groups.

21. A composition as set forth in claim 12 wherein the platinum-phosphorus complex (a) of the component (F) is a zero-valent platinum-phosphorus complex having the formula (R$_3^7$P)$_4$Pt in which the groups R$^7$, which can be the same or different, are monovalent groups selected from a monovalent, substituted or unsubstituted, hydrocarbon group, an alkoxy group and an aryloxy group.

22. A composition as set forth in claim 12 wherein the platinum-phosphorus complex (a) of the component (F) is a divalent platinum-phosphorus complex having the formula (R$_3^8$P)$_2$PtX$_2^2$ in which the groups R$^8$, which can be the same or different, are monovalent groups selected from monovalent, substituted or unsubstituted, hydrocarbon groups, an alkoxy group and an aryloxy group, and X$^2$ is a halogen atom.

23. A composition as set forth in claim 12 wherein the platinum-phosphorus complex (a) of the compnent (F) is a platinum-phosphorus composite complex having the formula [(R$_3^9$P)$_4$Pt][PtX$_4^3$] in which groups R$^9$, which can be the same or different, are monovalent groups selected from a monovalent, substituted or unsubstituted, hydrocarbon group, an alkoxy group and an aryloxy group, and X$^3$ stands for a halogen atom.

24. A composition as set forth in claim 12 wherein the amount of the complex (a) of the component (F) is 0.00005 to 0.01 part by weight.

25. A composition as set forth in claim 12 wherein the amount of the organic peroxide (b) of the component (F) is 2 to 1000 equivalents to the platinum of the complex (a) of the component (F).

26. A composition as set forth in claim 12 which further comprises an inorganic filler in an amount of up to 500 parts by weight per 100 parts by weight of the component (A).

27. A composition as set forth in claim 14 which further comprises an inorganic filler in an amount of up to 300 parts by weight per 100 parts by weight of the component (A).

28. A composition as set forth in claim 15 which further comprises an inorganic filler in an amount of up to 300 parts by weight per 100 parts by weight of the component (A).

* * * * *

UNITED STATES PATENT AND TRADEMARK OFFICE
CERTIFICATE OF CORRECTION

PATENT NO. : 4 329 275
DATED : May 11, 1982
INVENTOR(S) : Masayuki Hatanaka et al It is certified that error appears in the above—identified patent and that said Letters Patent is hereby corrected as shown below:

Column 23, line 31; change "saidpolyorganohydrogensiloxane," to ---said polyorganohydrogensiloxane,---.

Column 23, line 38; change "(a)" to ---(A)---.

Column 23, line 68; change "siloxane the" to ---"siloxane (B) the---.

Column 24, line 20; change "hydroxy" to ---alkoxy---.

Column 24, line 42; change "compnent" to ---component---.

Signed and Sealed this

Twenty-fourth Day of August 1982

|SEAL|

Attest:

GERALD J. MOSSINGHOFF

Attesting Officer      Commissioner of Patents and Trademarks